GAIN CONTROL SYSTEM FOR WAVE-SIGNAL RECEIVERS

Filed Feb. 15, 1952

INVENTOR:
ALBERT COTSWORTH III
BY Francis W. Crotty
HIS ATTORNEY.

United States Patent Office 2,700,074

Patented Jan. 18, 1955

2,700,074

GAIN CONTROL SYSTEM FOR WAVE-SIGNAL RECEIVERS

Albert Cotsworth III, Oak Park, Ill., assignor to Zenith Radio Corporation, a corporation of Illinois Application February 15, 1952, Serial No. 271,768

2 Claims. (Cl. 179—171)

Figures 1, 2:
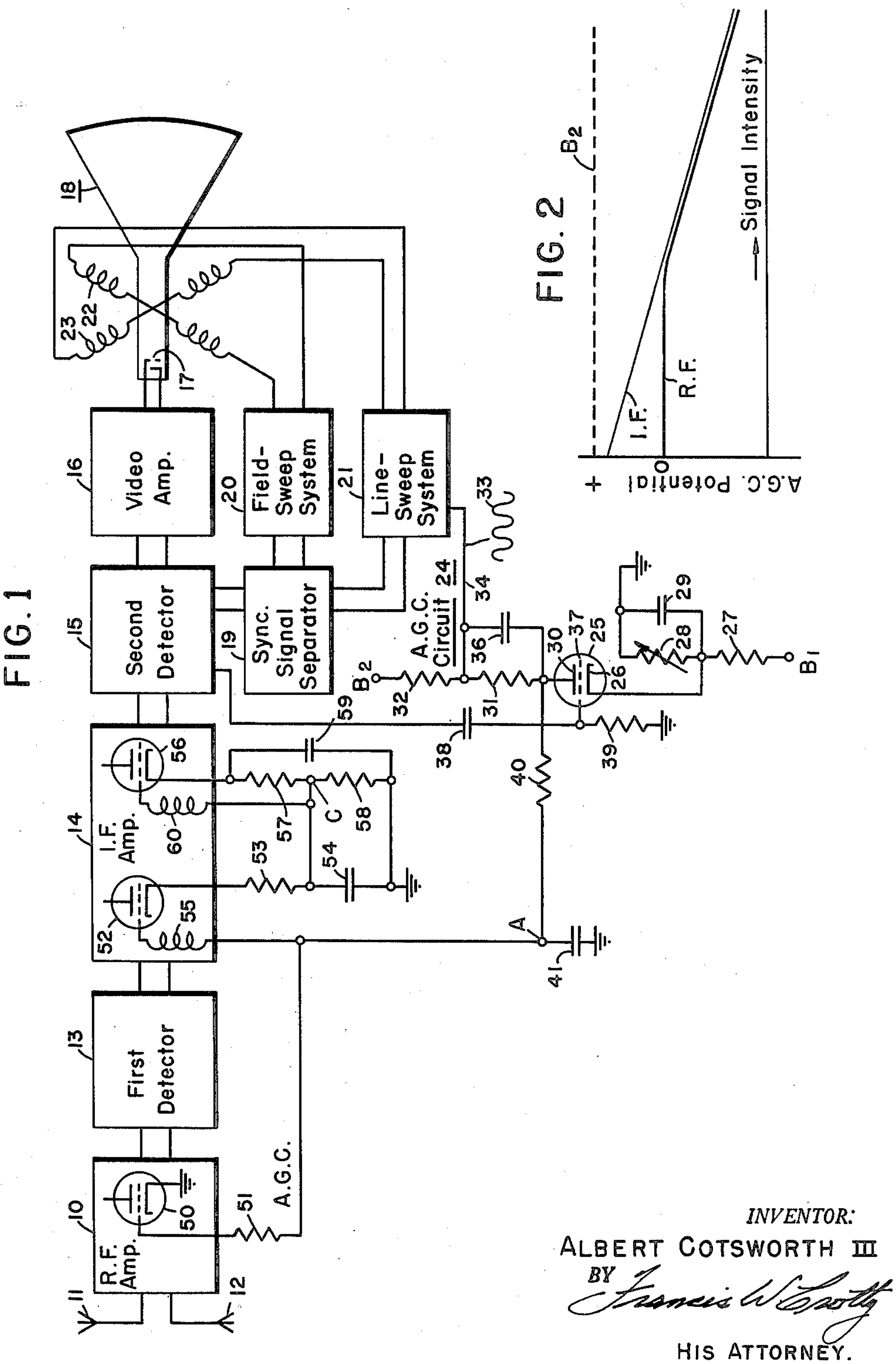

This invention relates to wave-signal receivers or the like which incorporate a control circuit for automatically controlling the gain in accordance with the intensity of signals translated thereby. More particularly, the invention is concerned with a superheterodyne receiver in which, for example, both the radio-frequency and intermediate-frequency amplifiers are selectively controlled by an automatic gain control circuit in such a manner that the control is first exerted on the intermediate-frequency amplifier, and then on the radio-frequency amplifier as the signal intensity exceeds a selected threshold value at which overloading of the receiver stages could otherwise occur.

It is, of course, most desirable that a wave-signal receiver exhibit maximum sensitivity to weak signals, and yet not become overloaded in the presence of increased signal intensities. Many difficulties have been encountered in the past in an effort to achieve an automatic gain control (AGC) circuit which meets both these requirements. Systems have been devised in which the gain of the intermediate-frequency amplifier alone is controlled for received signal intensities within a certain range of values, whereas the gain of the radio frequency amplifier is adjusted whenever the received signal intensity increases to a point where overloading may occur. However, prior art systems of this type are unduly complicated and require the addition of many extraneous components which render them commercially impractical.

It is an object of the present invention, therefore, to provide a wave-signal receiver which incorporates an improved AGC circuit constructed to function in a highly efficient and improved manner but which entails simple circuitry and relatively few added components.

A more specific object of the invention is to provide a gain control system for a wave-signal receiver which is constructed in an improved and simplified fashion to achieve maximum response to low-intensity signals and yet to prevent overloading in the presence of high-intensity signals.

In accordance with the present invention, a new and improved wave-signal receiver comprises first and second amplifiers, each including an electron-discharge device having an input electrode, for amplifying the received signals. The receiver also comprises a means for generating a unidirectional gain control voltage which varies inversely with the intensity of the received signals between a predetermined positive potential maximum and a predetermined negative potential minimum. The gain-control generating means comprises an electron-discharge device having a cathode, control electrode means, and an output electrode. The cathode is established at a predetermined positive potential substantially equal to the potential maximum of the gain-control voltage, and the received signals are impressed on the control electrode means. Output circuit means are coupled to the output electrode for deriving the gain-control voltage. Means consisting of a limiting resistance is coupled between the output circuit means and the input electrode of the first amplifier for controlling the gain of the first amplifier only in response to the negative-polarity variations of the gain-control voltage. Further means are provided for impressing on the input electrode of the second amplifier an effective negative bias potential substantially equal in absolute value to the predetermined potential maximum of the gain-control voltage. Finally, means are provided for superimposing the gain-control voltage on the negative bias potential to control the gain of the second amplifier in response to all variations of the gain-control voltage.

The features of this invention which are believed to be new are set forth with particularity in the appended claims. The invention itself, however, together with further objects and advantages thereof may best be understood by reference to the following description when taken in conjunction with the accompanying drawing in which:

Figure 1 represents a television receiver including a gain control system constructed in accordance with the invention, and Figure 2 comprises curves utilized in explaining the operation of the gain control system in respect of various stages of the receiver.

With reference to Figure 1, the television receiver there illustrated comprises a radio-frequency amplifier 10 of one or more stages having input terminals connected to an antenna circuit 11, 12 and output terminals connected to a first detector or oscillator modulator 13. The first detector is coupled through an intermediate-frequency amplifier 14 of any desired number of stages to a second detector 15 which, in turn, is connected to a video amplifier 16 of one or more stages. The output terminals of the video amplifier are connected to the input electrodes 17 of a cathode-ray image-reproducing device 18. Second detector 15 is further coupled to a synchronizing-signal separator 19 having output terminals connected to a field-sweep system 20 and to a line-sweep system 21. Sweep systems 20 and 21 are connected respectively to the field-deflection elements 22 and line-deflection elements 23 associated with reproducing device 18.

The receiver as thus far described is conventional in character, and when it is tuned to a signal intercepted by antenna circuit 11, 12, such signal is amplified in radio-frequency amplifier 10 and heterodyned to the selected intermediate frequency of the receiver in first detector 13. The resulting intermediate-frequency signal is amplified in amplifier 14 and detected in second detector 15 to produce a composite video signal. The composite video signal, after amplification in amplifier 16, is applied to input electrodes 17 of cathode-ray tube 18 to control the intensity of the cathode-ray beam produced therein in accordance with the image intelligence. The synchronizing components of the composite video signal are separated from the video information in synchronizing-signal separator 19, the field-synchronizing components being used to synchronize field-sweep system 20 and, therefore, the field scansion of device 18; whereas, the line-synchronizing components are used to synchronize sweep system 21 and, therefore, the line scansion of device 18. In this well known manner, the image reproducing device is enabled to reproduce on its viewing screen an image representing the picture intelligence conveyed by the television signal. Of course, the receiver will include suitable audio-frequency stages to translate the sound accompanying the video program but such stages have been omitted from the drawing because they constitute no essential part of the present invention. It will be evident that the sound portion may comprise a separate intermediate-frequency channel or intercarrier techniques may be adopted.

The television receiver further includes an automatic gain control circuit 24 which may be constructed in a manner similar to that disclosed in copending application Serial No. 134,410, filed December 22, 1949, in the name of the present inventor, now Patent No. 2,635,184, issued April 14, 1953, entitled "Automatic Gain Control Circuit" and assigned to the present assignee. The AGC circuit comprises an electron-discharge device 25 having a cathode 26 connected to the junction of resistors 27 and 28 which constitute a potentiometer connected between the positive terminal $B_1$ of a source of unidirectional potential and ground. Resistor 28 is variable and is preferably shunted by a by-pass capacitor 29. The anode 30 of device 25 is connected to the positive terminal $B_2$ of a source of unidirectional potential through resistors 31 and 32, resistor 31 being shunted by a capacitor 36. A sine-wave gating signal 33 synchronized as to frequency and phase with the line-synchronizing components of the received signal and centered about a zero potential axis by means of an A.-C. coupling device within unit 21, is derived from line-sweep system 21 and applied to the junction of resistors 31 and 32 by means of lead 34. The composite video signal from second detector 15 is supplied to the control electrode 37 of device 25 through a coupling capacitor 38, the control electrode being connected to ground through a grid-leak resistor 39. A filter, having an output terminal A and comprising a series-resistor 40 and a shunt capacitor 41 is coupled to anode 30 of device 25.

The composite video signal from second detector 15 is applied to device 25 with the synchronizing components extending in a positive direction and the sine-wave signal 33 from line-sweep system 21 as supplied to the anode 30 is so phased that its positive peaks occur in time coincidence with recurring line-synchronizing components of the composite video signal. Device 25 is normally biased to cut-off by means of potentiometer 27, 28 to be rendered conductive only in response to coincidence of the line-synchronizing components and the positive peak portions of sine wave 33. Therefore, current pulses flow through device 25 during the intervals of the line-synchronizing components and their amplitude is proportional to the intensity of the composite video signal derived from the second detector. These current pulses flow through network 31, 36 which has a time constant that is long with respect to the intervals between successive line-synchronizing components. Accordingly, the current pulses are integrated and a control potential is developed across network 31, 36 having amplitude variations corresponding to intensity variations of the signal derived from the second detector. The control potential is negative with respect to the positive terminal $B_2$ to which anode 30 is connected, and is supplied to the AGC string through fiter 40, 41, the filter functioning to remove the gating signal 33.

The value of source $B_2$ is so chosen that output terminal A of the AGC filter is established at a negative potential with respect to $B_2$ but is positive with respect to ground for received signals having an intensity between an initial and a selected higher threshold at which overloading might occur. However, for signal intensities above the selected threshold, the potential of terminal A increases in a negative sense with respect to ground. The relation between the potential of point A and the intensity of received signals is shown by the curve I. F. of Figure 2.

Radio-frequency amplifier 10 includes an electron-discharge device 50 having a cathode connected to ground which may be considered a first plane of reference potential. The control electrode of device 50 is connected to the output terminal A of the AGC filter through a biasing network including a limiting impedance or resistor 51. Intermediate-frequency amplifier 14, likewise, includes an electron-discharge device 52 having a cathode coupled to ground through series-connected resistor 53 and a capacitor 54. The control electrode of tube 52 is connected to terminal A through a biasing network which includes a winding 55, the winding forming the secondary of an inter-stage coupling transformer. The intermediate-frequency amplifier also includes an electron-discharge device 56 which is not under the direct control of the AGC system. Its cathode is connected to ground through series-connected resistors 57 and 58 shunted by a by-pass capacitor 59, while its control electrode is connected to the junction C of resistors 57 and 58 through a winding 60 which may be the secondary of an inter-stage coupling transformer. Junction C is connected to the junction of resistor 53 and capacitor 54 in the cathode circuit of device 52.

Under normal conditions of operation the bias of device 56, which is determined by the potential drop across resistor 57, remains substantially constant and the junction C is likewise established at a substantially constant positive potential with respect to ground. This junction may be considered as a source of bias potential for device 52 effectively in series with the control potential from terminal A. The value of source $B_2$, the parameters of the AGC circuit, and the values of resistors 57 and 58 are chosen to establish the potential of point C at a level substantially equal, or slightly negative, with respect to the potential of terminal A in the presence of weak signals. Consequently, the potential of the control electrode of device 52 is substantially equal to the potential of its cathode to provide maximum gain for such weak signals. It is to be noted that although point C provides a convenient bias source for device 52, any other suitable source may be used.

As the intensity of the received signals increases from an initial threshold to the selected threshold at which overloading could occur, the potential of terminal A decreases from its positive value with respect to ground until it approaches ground potential. As a result, an automatic gain control is exerted on device 52 because the potential of its control potential is driven negative with respect to its cathode. The reduced gain of device 52 and all other stages of amplifier 14 that may be connected to the AGC string tends to maintain the signal input to device 56 at a substantially constant level for received signal intensities within the above-mentioned thresholds. So long as the potential of AGC terminal A is positive with respect to ground, device 50 of the radio-frequency amplifier is not subject to gain-control action because a control potential of positive polarity applied to its control electrode tends to produce grid current, but the limiting effect of resistor 51 maintains the control electrode at substantially cathode potential.

Thus, the gain of the intermediate-frequency amplifier is decreased while the gain of the radio-frequency amplifier remains essentially constant as the received signal intensity increases from the initial threshold to the selected threshold at which terminal A becomes negative with respect to ground. Any increase in signal intensity beyond the selected threshold causes a reduction in gain in both the radio-frequency amplifier and the intermediate-frequency amplifier under the control of the AGC circuit. The gain control effect exerted on device 50 is represented by the curve R. F. of Figure 2, while the control exerted on device 52 is represented by the curve I. F.

The following parameters were used in a constructed embodiment of the invention, and are listed herein merely by way of illustration:

| | | |
|---|---|---|
| Discharge Device | 50 | 6BK7. |
| Resistor | 51 | 2.2 Megohms. |
| Discharge Device | 52 | 6CB6. |
| Resistor | 53 | 56 Ohms. |
| Capacitor | 54 | 1,000 Micromicrofarads. |
| Resistor | 57 | 100 Ohms. |
| Do | 58 | 330 Ohms. |
| Capacitor | 59 | 470 Micromicrofarads. |
| Source $B_2$ | +12 | Volts. |

The invention provides, therefore, a wave-signal receiver which is constructed in an improved and simplified fashion so that various amplifiers therein may be selectively controlled to achieve maximum response to low-intensity signals and yet to prevent overloading in the presence of high-intensity signals.

While a particular embodiment of the invention has been shown and described, modifications may be made and it is intended in the appended claims to cover all such modifications as may fall within the true spirit and scope of the invention.

I claim:

1. A receiver for utilizing received wave-signals comprising: first and second amplifiers, each comprising an electron-discharge device having an input electrode, for amplifying said received wave-signals; means for generating a unidirectional gain-control voltage which varies inversely with the intensity of said received signals between a predetermined positive potential maximum and a predetermined negative potential minimum, said generating means comprising an electron-discharge device having a cathode, control electrode means, and an output electrode, means for establishing said cathode at a predetermined positive potential substantially equal to said predetermined potential maximum, means for impressing said received signals on said control electrode means, and output circuit means coupled to said output electrode for deriving said gain-control voltage; means consisting of a limiting resistance coupled between said output circuit means and said input electrode of said first amplifier for effecting control of the gain of said first amplifier only in response to the negative-polarity variations of said gain-control voltage; means for impressing on said input electrode of said second amplifier an effective negative bias potential substantially equal in absolute value to said predetermined potential maximum; and means for superimposing said gain-control voltage on said negative bias potential to control the gain of said second amplifier in response to all variations of said gain-control voltage.

2. A television receiver for utilizing received composite television signals including video-signal components and synchronizing-signal components comprising: a radio-frequency amplifier, including an electron-discharge device having an input electrode, for amplifying said composite television signals; an intermediate-frequency amplifier, coupled to said radio-frequency amplifier and including an electron-discharge device having an input electrode, for amplifying said composite television signals; means for generating a unidirectional gain-control voltage which varies inversely with the intensity of said synchronizing-signal components of said composite television signals between a predetermined positive potential maximum and a predetermined negative potential minimum, said generating means comprising an electron-discharge device having a cathode, control electrode means, and an output electrode, means for establishing said cathode at a predetermined positive potential substantially equal to said predetermined potential maximum, means for impressing said composite television signals on said control electrode means, means coupled to said output electrode for rendering said last-mentioned electron-discharge device conductive substantially only in response to said synchronizing-signal components, and output circuit means coupled to said output electrode for deriving said gain-control voltage; means consisting of a limiting resistance coupled between said output circuit means and said input electrode of said radio-frequency amplifier for effecting control of the gain of said radio-frequency amplifier only in response to the negative-polarity variations of said gain-control voltage; means for impressing on said input electrode of said intermediate-frequency amplifier an effective negative bias potential substantially equal in absolute value to said predetermined potential maximum; and means for superimposing said gain-control voltage on said negative bias potential to control the gain of said intermediate-frequency amplifier in response to all variations of said gain-control voltage.

References Cited in the file of this patent

UNITED STATES PATENTS 2,559,038 Bass ------------------- July 3, 1951